United States Patent
Krus

(10) Patent No.: US 9,694,761 B2
(45) Date of Patent: Jul. 4, 2017

(54) THERMALLY SHIELDING BODY WITH TEMPERATURE-RESISTANT FASTENING POINTS, AND METHOD FOR PRODUCING IT

(75) Inventor: Ralf Krus, Lindlar (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 638 days.

(21) Appl. No.: 14/342,507

(22) PCT Filed: May 8, 2012

(86) PCT No.: PCT/EP2012/058411
§ 371 (c)(1),
(2), (4) Date: Mar. 3, 2014

(87) PCT Pub. No.: WO2013/034321
PCT Pub. Date: Mar. 14, 2013

(65) Prior Publication Data
US 2014/0216697 A1    Aug. 7, 2014

(30) Foreign Application Priority Data
Sep. 5, 2011 (DE) .......... 10 2011 082 132

(51) Int. Cl.
*B60R 13/08* (2006.01)
*F01N 13/14* (2010.01)
*F01N 13/18* (2010.01)

(52) U.S. Cl.
CPC ........ *B60R 13/0876* (2013.01); *F01N 13/148* (2013.01); *F01N 13/1855* (2013.01); *F01N 2260/20* (2013.01); *Y10T 29/4935* (2015.01)

(58) Field of Classification Search
CPC ...... F02B 77/11; F02B 77/13; F01N 2260/20; F01N 13/148; F16L 59/12;
(Continued)

(56) References Cited

U.S. PATENT DOCUMENTS 6,328,513 B1 * 12/2001 Niwa .................. G10K 11/168
                                                        16/2.1
7,273,128 B2 * 9/2007 Niwa .................. B60R 13/0876
                                                        181/207
(Continued)

FOREIGN PATENT DOCUMENTS

DE          10247641 B3     1/2004
DE        102005006577 A1   8/2006
(Continued)

*Primary Examiner* — Tho V Duong
(74) *Attorney, Agent, or Firm* — Robert L. Stearns; Dickinson Wright, PLLC

(57) ABSTRACT

Thermally shielding body having at least one temperature-resistant fastening point, comprising a thermally shielding plate made from aluminum, wherein the thermally shielding plate made from aluminum has a cut-out in the region of at least one fastening point, wherein a metal-plate element with greater heat resistance is arranged in the cut-out, which metal-plate element is connected in a material-to-material manner to the thermally shielding plate at the edge of the cut-out or of the metal-plate element, wherein the at least one heat-resistant fastening point in arrange on the metal-plate element with greater heat resistance, and at method for producing the thermally shielding body.

16 Claims, 2 Drawing Sheets

(58) Field of Classification Search
CPC ......... B60R 2013/0807; B60R 13/0876; F16B 5/0241; Y10T 29/4935
See application file for complete search history.

(56) References Cited

U.S. PATENT DOCUMENTS

| | | | |
|---|---|---|---|
| 9,133,869 B2 * | 9/2015 | Friedow | F16B 5/0241 |
| 2004/0081537 A1 * | 4/2004 | Nishikawa | B62D 25/2072 411/437 |
| 2007/0280780 A1 * | 12/2007 | Bruehl | F01N 13/008 403/179 |
| 2009/0000861 A1 * | 1/2009 | Hikami | F01N 13/102 181/200 |
| 2010/0047011 A1 * | 2/2010 | Eberle | B60R 13/0206 403/280 |
| 2011/0067952 A1 * | 3/2011 | Oxenknecht | B60R 13/0876 181/284 |
| 2011/0094824 A1 * | 4/2011 | Akimoto | B21D 47/00 181/205 |

FOREIGN PATENT DOCUMENTS

| | | |
|---|---|---|
| DE | 102005015244 A1 | 10/2006 |
| DE | 102005015246 A1 | 10/2006 |
| DE | 202010013507 U1 | 2/2011 |
| EP | 1 548 246 A2 | 6/2005 |
| EP | 1548246 A2 | 6/2005 |
| EP | 1609681 A1 | 12/2005 |

* cited by examiner

THERMALLY SHIELDING BODY WITH TEMPERATURE-RESISTANT FASTENING POINTS, AND METHOD FOR PRODUCING IT

BACKGROUND OF THE INVENTION

1. Technical Field

The present invention concerns a thermally shielding body with temperature-resistant fastening points.

2. Related Art

Conventional shielding elements such as acoustically or thermally shielding plates are, for example, of known art from the documents EP 1 609 681 A1, DE 10 2005 015 246 A1, DE 10 2005 015 244 A1, DE 10 2005 006 577 A1 and DE 102 47 641 B3.

Conventional shielding elements made from aluminium such as acoustically or thermally shielding plates often cannot be fastened directly to particularly hot components such as an exhaust manifold, a turbocharger, etc, since under operating conditions these components reach temperatures that are higher than the melting point of aluminium.

In the prior art there exists therefore a requirement to be able to mount shielding bodies made from aluminium also directly onto components whose operating temperature lies above the melting point of aluminium of approx. 660° C.

SUMMARY OF THE INVENTION

In accordance with a first aspect of the present invention a thermally shielding body with at least one temperature-resistant fastening point is provided. The thermally shielding body comprises a thermally shielding plate made from aluminium. The thermally shielding plate made from aluminium has a cut-out in the region of at least one temperature-resistant fastening point. A metal-plate element with greater heat resistance is arranged in the region of the at least one cut-out, which metal-plate element is connected in a material-to-material manner with the thermally shielding plate at the edge of the cut-out or metal-plate element. The temperature-resistant fastening point is arranged on the metal-plate element with greater heat resistance.

The metal-plate element with greater heat resistance can be connected in a material-to-material manner with the thermally shielding plate at the edge of the cut-out, as a result of which the thickness of the thermally shielding body can be held low. The metal-plate element with greater heat resistance can also be connected in a material-to-material manner with the thermally shielding plate at the edge of the metal-plate element, wherein in this form of embodiment the thermally shielding plate can at least partially shield the metal-plate element outwardly.

The metal-plate element is produced from a metal plate with a heat resistance that is greater in comparison to aluminium. The fastening point can be embodied as a bore, or a threaded hole, or as a seating for another fastening element. It is also envisaged that the fastening point can be embodied as a structure that can be inserted into, or brought into engagement with, a complementary structure on a hot engine element, such as a part of an exhaust system of an internal combustion engine.

In an exemplary form of embodiment the metal-plate element with greater heat resistance extends like a frame along at least a part of the edge, or along the whole edge, of the thermally shielding plate made from aluminium. In this manner the thermally shielding plate made from aluminium can be further reinforced, particularly at the edge, in order, for example, to increase the vibration resistance of the thermally shielding body.

In another exemplary form of embodiment the metal-plate element with greater heat resistance is connected in an essentially point-wise, material-to-material manner with the thermally shielding plate made from aluminium. In this form of embodiment provision is made to deform the metal-plate element that is connected with the thermally shielding plate in only a point-wise manner (in the sense of a welding point, not in the sense of a "geometrical point"), as well as to deform the thermally shielding plate between the welding points such that a row of ventilation openings is formed that can contribute to a better cooling of the material-to-material connection. Here both the metal-plate element and also the thermally shielding plate can be deformed into a corrugated shape.

In a further exemplary form of embodiment the metal-plate element with greater heat resistance is connected with the thermally shielding plate in a line-wise or area-wise material-to-material manner along essentially the whole edge or along the edge of the cut-out. This form of embodiment serves the purpose of transferring as much heat as possible from the metal-plate element to the thermally shielding plate, in order to offload thermally the region of the material-to-material connection by means of the heat removal in the direction of the thermally shielding plate. This is particularly suitable for forms of embodiment of thermally shielding bodies in which the metal-plate element is connected with the face of the thermally shielding plate that is facing away from the heat source that is to be shielded.

In an additional exemplary form of embodiment the material-to-material connection is achieved by means of electromagnetic pulse plate welding. Electromagnetic pulse technology (EMPT) is a non-contact production method for the welding, joining, forming and cutting of metals. In this method electromagnetic coils are used, through which a very high current flows briefly, which current is provided by a pulse generator. In particular by means of electromagnetic forces even non-magnetic metals such as aluminium can be processed and in particular deformed. In the case of material-to-material electromagnetic pulse plate welding material-to-material connections of metallic materials can be produced without the need to apply thermal loads, as a result of which alterations in structure can be avoided. Stainless steels that are difficult to weld can be joined together in a material-to-material manner with this technology, as can also material pairings such as e.g. aluminium-steel or steel-copper.

In another exemplary form of embodiment the material-to-material connection is achieved by means of friction welding or orbital friction welding. Friction welding also enables a material-to-material connection of material pairings such as aluminium-steel.

In a further exemplary form of embodiment the material-to-material connection is achieved by means of ultrasonic welding. Ultrasonic welding also permits relatively simple material pairings such as aluminium-steel to be connected together in a material-to-material manner.

In an additional exemplary form of embodiment the thermally shielding plate is composed of a plurality of layers. In one form of embodiment the shielding plate comprises at least two plates, at least one made from aluminium, wherein the multi-layer shielding plate has a total thickness of between 2 mm and 10 mm. Furthermore it is possible to combine more than two plates made from aluminium to form a shielding plate with a total thickness of between 2 mm and 10 mm. In particular the shielding plate can be embodied as a "3D part", which is matched to a geometry of a machine part that is to be shielded, such as, for example, an exhaust manifold or a turbocharger. The shielding plate can moreover be provided with openings for sound insulation or with additional insulating layers. The thickness of the shielding plate can also be varied so as to reinforce the thermally shielding body. In addition the shielding plate can be provided in at least one layer with ribs or beads to stiffen the shielding plate. Provision is also made to reinforce the structure of the shielding plate in severely loaded regions by means of strain hardening, ribs, beads, corrugations, and/or flanges. In a basic form the thermally shielding plate can, for example, be embodied as a plain single layer aluminium sheet with a thickness of between 0.3 and 1.5 mm. In another form of embodiment the thermally shielding plate is, for example, embodied as a structured single layer aluminium sheet with a thickness of between 0.3 and 1.5 mm. Provision is moreover made to insert perforated sheets for purposes of acoustic shielding.

In another exemplary form of embodiment the thermally shielding plate comprises at least two layers, which are connected together by means of clinching, toxing, flanging, riveting, adhesive bonding, pressure joining, punch riveting, or also by means of welding.

In a further exemplary form of embodiment the metal-plate element with greater heat resistance comprises coated steel or stainless steel, which has a thickness of between 0.2 mm and 1 mm. In particular these material thicknesses are suitable for aluminium shielding plates with a thickness of between 0.3 mm and 10 mm.

In an additional exemplary form of embodiment the metal-plate element with greater heat resistance and the thermally shielding plate overlap, and moreover are connected together in the region of the overlap in a material-to-material manner. The overlap permits a simple connection of the metal-plate element and the thermally shielding plate. The metal-plate element can be arranged on the face of the thermally shielding plate that is facing towards the heat source that is to be shielded. This form of embodiment permits, for example, the thermally shielding plate to be partially led over the metal-plate element, and in this manner also permits a particularly good thermal shielding of the fastening elements, with which the thermally shielding body is fastened, to be achieved. The metal-plate element can also be arranged on the face of the thermally shielding plate that is facing away from the heat source that is to be shielded. This form of embodiment permits the metal-plate element to be cooled via the rear face of the thermally shielding plate, and thus permits the material-to-material connection to be thermally offloaded. This form of embodiment furthermore has the advantage that in the event of a failure of the material-to-material connection the thermally shielding plate can still be held by means of the larger metal-plate elements; this applies in particular in the case of round closed cut-outs.

In another exemplary form of embodiment the metal-plate element with greater heat resistance, is provided with a structure to enable a point-wise or line-wise contact with the hot component. By means of a point-wise or line-wise contact surface, in comparison to an area-wise contact, the heat conduction between the contact of the metal-plate element and the component on which the metal-plate element is fastened can be minimised, as a result of which in turn the heat transfer from the component to the thermally shielding plate can be minimised. As a result of the smaller contact surface the heat transfer led through the contact surface is also minimised.

In a further exemplary form of embodiment the shielding body comprises further elements of the metal-plate element with greater heat resistance, which are connected in a material-to-material manner with the thermally shielding plate. These metal-plate elements with greater heat resistance serve in this form of embodiment to reinforce the structure of the thermally shielding plate. The metal-plate elements with greater heat resistance can, with or without corresponding cut-outs on the thermally shielding plate, be fastened to the latter in a material-to-material manner, Here, however, the use of the metal-plate element with greater heat resistance should be avoided as far as possible in order to avoid increasing the weight of the shielding part as little as possible.

In an additional exemplary form of embodiment the thermally shielding body further comprises holders, clips, nipples, threaded elements, which are connected in a material-to-material manner with the metal-plate element with greater heat resistance and/or with the thermally shielding plate. The holders, clips, nipples, threaded elements are preferably connected with the thermally shielding body in a form fit. It is, however, also possible to connect these elements in the region of the metal-plate element with greater heat resistance in a material-to-material manner, in particular if the metal-plate element serves as reinforcement. These holders, clips, nipples, threaded elements can, for example, serve the purpose of holding lines from sensors such as a lambda probe.

In accordance with a further aspect of the present invention a method for producing a thermally shielding body is provided, as has been described above. The method thereby comprises at least the provision of a thermally shielding plate that is provided with cut-outs, and the provision of a metal-plate element with greater heat resistance, as well as the material-to-material connection of the metal-plate element with greater heat resistance with the thermally shielding plate. The material-to material connection is generated at least in the region of the cut-outs of the thermally shielding plate. The metal-plate element with greater heat resistance thereby comprises at least one temperature-resistant fastening point. The material-to-material connection can, for example, take place before or after the assembly of the layers of a multi-layer shielding plate. The material-to-material connection can be achieved by means of one of the above described joining methods, which are particularly suitable for the connection of aluminium and steel or iron materials.

The method should also be able to comprise all steps that are described in the production or forming of one of the above described representational features of an inventive thermally shielding body. All steps that are necessary in order to provide or generate the above described representational features are also therefore to be considered as disclosed.

THE DRAWINGS

In the figures preferred and simplified forms of embodiment are represented to illustrate the invention.

DETAILED DESCRIPTION

In both the figures and their description the same or similar reference symbols are used to designate the same or similar elements.

Figure 1:
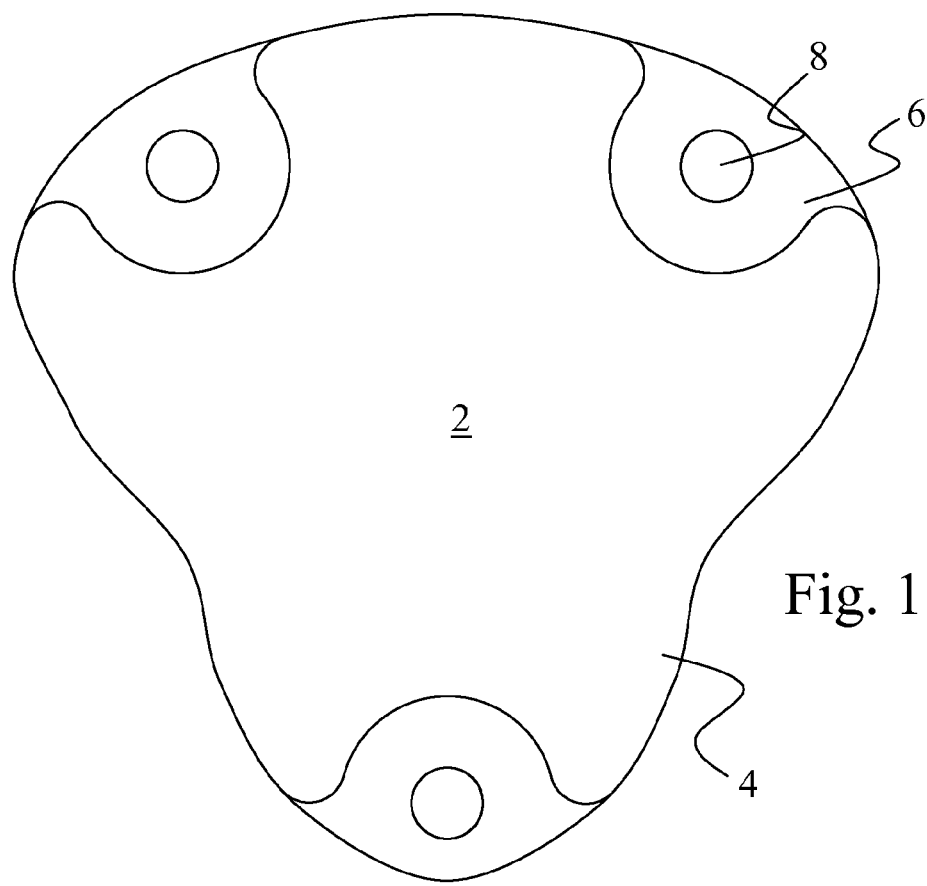
FIG. 1 shows a view of an inventive thermally shielding body.

FIG. 1 shows a view of an inventive thermally shielding body 2 that is provided with three temperature-resistant fastening points 8. The thermally shielding body 2 comprises a single- or multi-layer thermally shielding plate 4 made from aluminium. The thermally shielding plate 4 made from aluminium is provided with a cut-out in the region of at least one fastening point 8. A metal-plate element 6 with greater heat resistance is arranged in the cut-out, which metal-plate element is connected in a material-to-material manner with the thermally shielding plate 4 at an edge of the cut-out or the metal-plate element 6. The at least one temperature-resistant fastening point 8 is thereby arranged on the metal-plate element 6 with greater heat resistance. As can be discerned from the drawing, the edge of the cut-out of the thermally shielding plate 4 is a constant distance from the fastening point 8. This is essentially conditioned by a temperature gradient in the metal-plate element 6 between the fastening point 8 and the edge of the cut-out of the thermally shielding plate 4. Under operating conditions the temperature in this region should have fallen to the extent that the edge of the thermally shielding plate 4 is located sufficiently far below the melting temperature of aluminium for the thermally shielding body to be able to fulfil its function.

Figure 2:
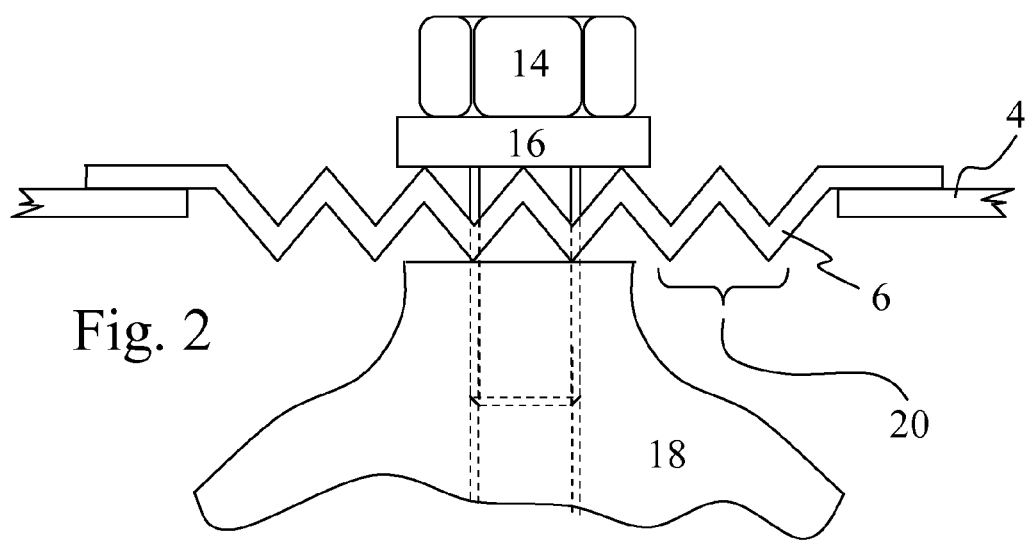
FIG. 2 represents a scrap section view through a fastening region of an inventive thermally shielding body.

FIG. 2 represents a scrap section view through a fastening region of an inventive thermally shielding body 2. The thermally shielding plate 4 made from aluminium is only indicated at the edges of the scrap section. The metal-plate element 6 with greater heat resistance is fastened to a thermally loaded component 18 with a screw 14 and a flat washer/spring washer 16. The thermally loaded component 18 can, for example, be an exhaust manifold or part of a turbocharger housing.

The metal-plate element 6 with greater heat resistance overlaps the thermally shielding plate 4 made from aluminium, and is connected with the latter in the region of the overlap in a material-to-material manner. Here the metal-plate element 6 is arranged on the face of the thermally shielding plate 4 that is facing away from the heat source that is to be shielded. This form of embodiment permits the metal-plate element 6 to be cooled via the rear face of the thermally shielding plate 6, and thus permits the material-to-material connection to be thermally offloaded. This form of embodiment furthermore has the advantage that in the event of a failure of the material-to-material connection the thermally shielding plate 4 can still be held by means of the larger metal-plate element, particularly if the cut-out is circular and has no connection with the edge.

The metal-plate element 6 is provided with a structure to enable a line-wise contact with the hot component 18 and the washer 16. By this means the heat transfer from the component 18 and the washer 16 to the metal-plate element 6 can be reduced. Here the structure is embodied as a straight corrugation with a triangular shape. The structure also extends into the region 20 near the point at which the metal-plate element 6 is clamped between the hot component and the washer 16. In the region 20 this structure serves the purpose of increasing the actual distance over which heat transfer can take place from the component 18 or the washer 16 to the thermally shielding plate 4, so as to minimise this heat transfer. Furthermore in the region 20 the structure enables a certain elastic coupling between the thermally shielding body 2 and the component 18, as a result of which thermal expansions can be offset and vibrations can be decoupled from the component 18.

Figure 3:
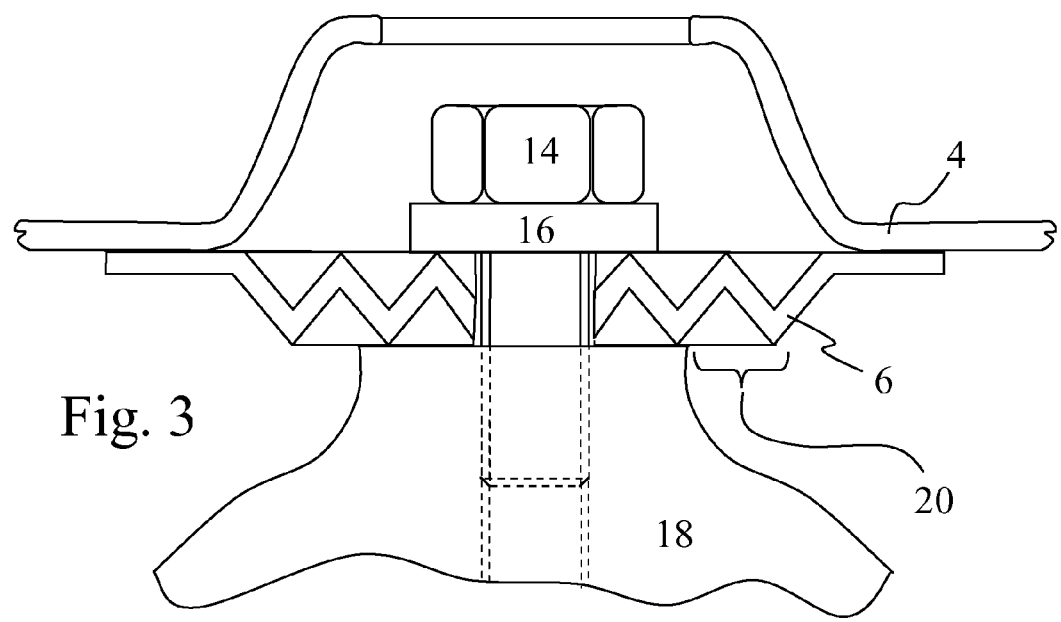
FIG. 3 represents a scrap section view through a fastening region of another form of embodiment of an inventive thermally shielding body.

FIG. 3 represents a scrap section view through a fastening region of another form of embodiment of an inventive thermally shielding body. The thermally shielding plate 4 made from aluminium, the metal-plate element 6 with greater heat resistance, the screw 14 and a flat washer/spring washer 16 and also the thermally loaded component 18 correspond essentially to the elements represented in FIG. 2.

In a similar manner to FIG. 2 the metal-plate element 6 with greater heat resistance overlaps the thermally shielding plate 4 made from aluminium, and is connected with the latter in the region of the overlap in a material-to-material manner. Here the metal-plate element 6 is arranged on the face of the thermally shielding plate 4 that is facing towards the heat source that is to be shielded, i.e. the component 18. As illustrated, this form of embodiment permits the thermally shielding plate 4 to be partially led over the metal-plate element 6, and thus permits a particularly good shielding to be achieved, in particular of the metal-plate element 6 and the head of the screw 14. Here the metal-plate element 6 is connected with the thermally shielding plate 4 in a material-to-material manner at the edge of the metal-plate element 6.

In a similar manner to FIG. 2, the metal-plate element 6 is provided with a structure to enable a line-wise contact with the hot component 18 and the washer 16. In FIG. 3 the structure is embodied as annular corrugations around the screw 14. As in FIG. 2, the corrugations have a triangular shape. However, other shapes of corrugation are also possible. In FIG. 3 the structure also extends into the region 20 near the point at which the metal-plate element 6 is clamped, with the same objectives as have already been described with reference to FIG. 2.

Figure 4:
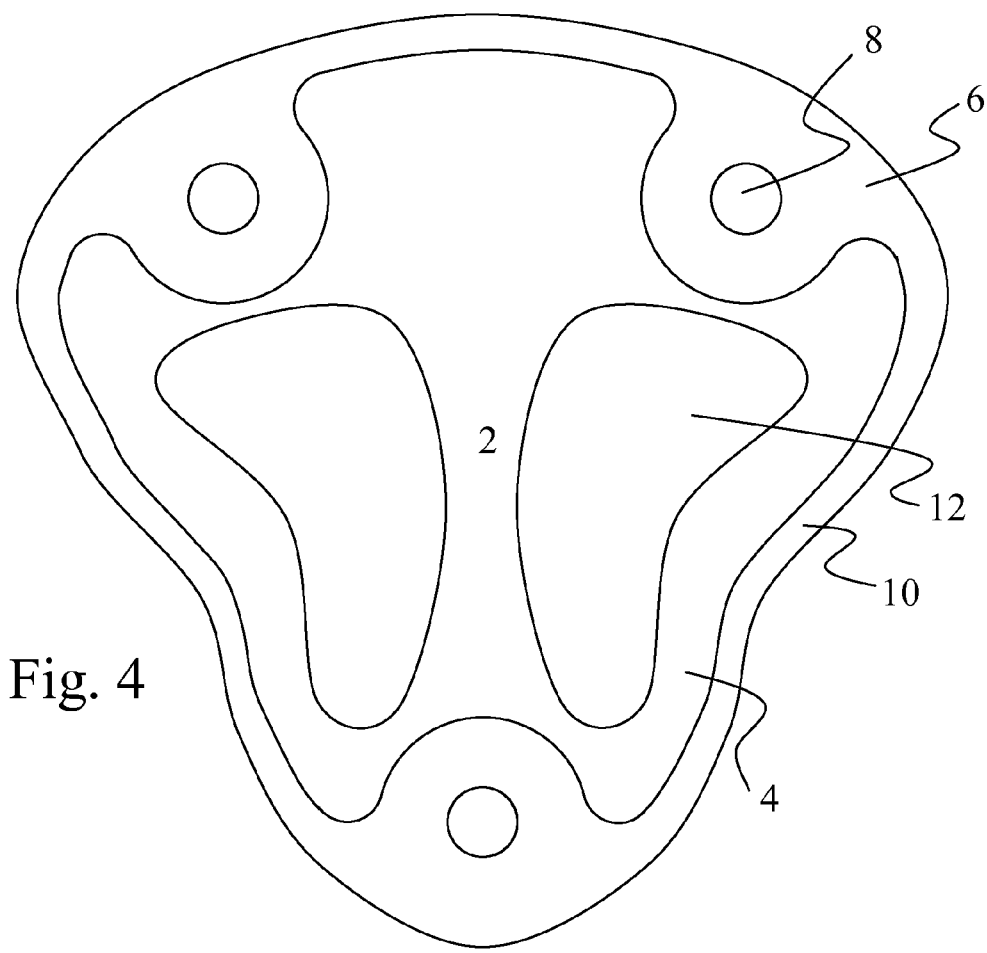
FIG. 4 represents a view of another form of embodiment of an inventive thermally shielding body.

FIG. 4 shows a view of another form of embodiment of the inventive thermally shielding body of FIG. 1. As in FIG. 1 the thermally shielding body 2 indicates three temperature-resistant fastening points 8. In contrast to the form of embodiment represented in FIG. 1 the metal-plate element 6 with greater heat resistance extends around the whole edge of the thermally shielding plate 4. In this form of embodiment the thermally shielding plate 4 is further stabilised and reinforced by the peripheral one-piece metal-plate element 6 so that it can also be used on components that vibrate severely. In addition the thermally shielding plate 4 is also provided with reinforcements 12 that can be attached directly onto the thermally shielding plate 4. The reinforcements 12 can also close previously applied cut-outs (not represented). The reinforcements 12 can consist of the same material as the metal-plate elements 6, as a result of which they can be connected in a material-to-material manner with the thermally shielding plate 4 using the same joining method.

It should be clear that the present invention is not limited to the embodiments illustrated in the figures, but only by the scope of protection as defined in the claims. Furthermore all combinations of individual features, each of which is disclosed individually in the respective forms of embodiment, are also deemed to be disclosed.

The invention claimed is:

1. A thermally shielding body with at least one temperature-resistant fastening point, comprising a thermally shielding plate made from aluminium, wherein the thermally shielding plate has a cut-out in the region of the at least one fastening point, wherein a metal-plate element with greater heat resistance is arranged in the out-out, which metal-plate element is connected in a material-to-material manner with the thermally shielding plate at the edge of the cut-out or the metal-plate element, wherein
the at least one temperature-resistant fastening point is arranged on the metal-plate element; and wherein the metal-plate element with greater heat resistance extends as a frame along at least a portion of a peripheral edge of the thermally shielding plate made from aluminium.

2. The thermally shielding body in accordance with claim 1, wherein the metal-plate element with greater heat resistance extends as a frame along the whole edge of the thermally shielding plate made from aluminium.

3. The thermally shielding body in accordance with claim 1, wherein the metal-plate element with greater heat resistance is connected in substantially point-wise, material-to-material manner with the thermally shielding plate made from aluminium.

4. The thermally shielding body in accordance with claim 1, wherein
the metal-plate element with greater heat resistance is connected with the thermally shielding plate in a line-wise, material-to-material manner along essentially the whole edge, or along the edge, of the cut-out.

5. The thermally shielding body in accordance with claim 1, wherein
the material-to-material connection is an electromagnetic pulse plate welding.

6. The thermally shielding body in accordance with claim 1, wherein
the material-to-material connection is a friction welding or orbital friction welding.

7. The thermally shielding body in accordance with claim 1, wherein
the material-to-material connection is an ultrasonic welding.

8. The thermally shielding body in accordance with claim 1, wherein
the thermally shielding plate is composed of a plurality of layers, for example at least two plates; at least one of these made from aluminium with a total thickness of between 2 mm and 10 mm; more than two plates made from aluminium with a total thickness of between 2 mm and 10 mm.

9. The thermally shielding body in accordance with claim 8, wherein
inasmuch as the thermally shielding plate comprises at least two layers, wherein the layers are connected together by means of clinching, toxing, flanging, riveting, adhesive bonding, pressure joining, punch riveting, or by means of welding.

10. The thermally shielding body in accordance with claim 1, wherein the metal-plate element with greater heat resistance is coated steel or stainless steel, with a thickness of between 0.2 mm and 1 mm.

11. The thermally shielding body in accordance with claim 1, wherein the metal-plate element with greater heat resistance and the thermally shielding plate overlap one another, and are connected together in the region of the overlap in a material-to-material manner.

12. The thermally shielding body in accordance with claim 1, wherein the metal-plate element with greater heat resistance, is provided with a structure to enable a point-wise or line-wise contact with a hot component to be shielded, and/or to minimise the heat conduction between the contact and the thermally shielding plate.

13. The thermally shielding body in accordance with claim 1, further comprising elements from the metal-plate element with greater heat resistance, which are connected with the thermally shielding plate in a material-to-material manner, and serve to reinforce the structure of the thermally shielding plate.

14. The thermally shielding body in accordance with claim 1, further comprising holders, clips, nipples, threaded elements, which are connected in a material-to-material manner with the metal-plate element with greater heat resistance and/or with the thermally shielding plate.

15. A method for producing a thermally shielding body in accordance with claim 1, comprising at least:
the provision of the thermally shielding plate that is provided with cut-outs; the provision of the metal-plate element with greater heat resistance, as well as the material-to-material connection of the metal-plate element with greater heat resistance with the thermally shielding plate, at least in a region of the cut-outs of the thermally shielding plate, wherein
the metal-plate element with greater heat resistance has the at least one temperature-resistant fastening point and is extended as a frame along at least a portion of the peripheral edge of the thermally shielding plate.

16. The method of claim 15 further including extending the metal-plate element with greater heat resistance as a frame along the whole edge of the thermally shielding plate.

* * * * *